(12) United States Patent
Barnes

(10) Patent No.: US 10,638,888 B1
(45) Date of Patent: May 5, 2020

(54) TABLEWARE ARTICLE

(71) Applicant: Sheila Vanessa Barnes, Pittsburgh, PA (US)

(72) Inventor: Sheila Vanessa Barnes, Pittsburgh, PA (US)

( * ) Notice: Subject to any disclaimer, the term of this patent is extended or adjusted under 35 U.S.C. 154(b) by 0 days.

(21) Appl. No.: 16/400,442

(22) Filed: May 1, 2019

(51) Int. Cl.
| | |
|---|---|
| *A23G 9/32* | (2006.01) |
| *B65D 85/72* | (2006.01) |
| *A47J 47/16* | (2006.01) |
| *A47G 19/08* | (2006.01) |
| *A47G 21/14* | (2006.01) |
| *A23G 9/50* | (2006.01) |

(52) U.S. Cl.
CPC .............. *A47J 47/16* (2013.01); *A23G 9/503* (2013.01); *A47G 19/08* (2013.01); *A47G 21/145* (2013.01); *B65D 85/72* (2013.01)

(58) Field of Classification Search
CPC ................................. A23G 9/503; B65D 85/78
See application file for complete search history.

(56) References Cited

U.S. PATENT DOCUMENTS

| | | | | |
|---|---|---|---|---|
| 1,829,664 A | * | 10/1931 | McKay ................... | A47J 19/02 211/2 |
| 2,632,708 A | * | 3/1953 | Sueskind ............... | A23G 9/503 426/134 |
| 2,948,452 A | * | 8/1960 | Grogan ................. | A23G 9/503 426/132 |
| 4,069,996 A | * | 1/1978 | Koziol ................... | A23G 3/563 141/391 |
| 4,226,355 A | * | 10/1980 | Helfrich, Jr. .......... | A23G 9/288 229/932 |
| 5,182,854 A | | 2/1993 | Voss | |
| 5,515,998 A | | 5/1996 | Wang | |
| 5,747,928 A | | 5/1998 | Shanks et al. | |
| 5,955,099 A | * | 9/1999 | White .................... | A23G 3/563 220/4.22 |
| 5,979,695 A | * | 11/1999 | Valls ..................... | B65D 85/78 220/666 |
| 6,571,979 B2 | * | 6/2003 | Schmarr ................ | A23G 9/503 220/501 |
| 9,033,180 B1 | | 5/2015 | Falke | |
| 2001/0017299 A1 | * | 8/2001 | Schmarr ................ | A23G 9/503 220/571 |
| 2008/0279992 A1 | | 11/2008 | Kahn | |
| 2011/0223292 A1 | | 9/2011 | Kushner | |
| 2012/0205382 A1 | * | 8/2012 | Price ........................ | A23G 9/22 220/574 |

* cited by examiner

*Primary Examiner* — Kimberley S Wright

(57) ABSTRACT

A tableware article for supporting an edible item in an upright position includes a pair of bowls, a stem, and a bracing element. The stem is coupled to and extends between bottoms of the bowls so that, when a top of one of the pair of bowls is positioned on a substantially horizontal surface, the top of the other of the pair of bowls is configured to insert at least one of an item of food and a utensil. The bracing element is positioned within a respective bowl and is coupled to the bottom of the respective bowl. The bracing element is configured to support at least one of an associated item of food and an associated utensil.

12 Claims, 12 Drawing Sheets

TABLEWARE ARTICLE

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to tableware articles and more particularly pertains to a new tableware article for supporting an edible item in an upright position.

BRIEF SUMMARY OF THE INVENTION

An embodiment of the disclosure meets the needs presented above by generally comprising a pair of bowls, a stem, and a bracing element. The stem is coupled to and extends between bottoms of the bowls so that, when a top of one of the pair of bowls is positioned on a substantially horizontal surface, the top of the other of the pair of bowls is configured to insert at least one of an item of food and a utensil. The bracing element is positioned within a respective bowl and is coupled to the bottom of the respective bowl. The bracing element is configured to support at least one of an associated item of food and an associated utensil.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
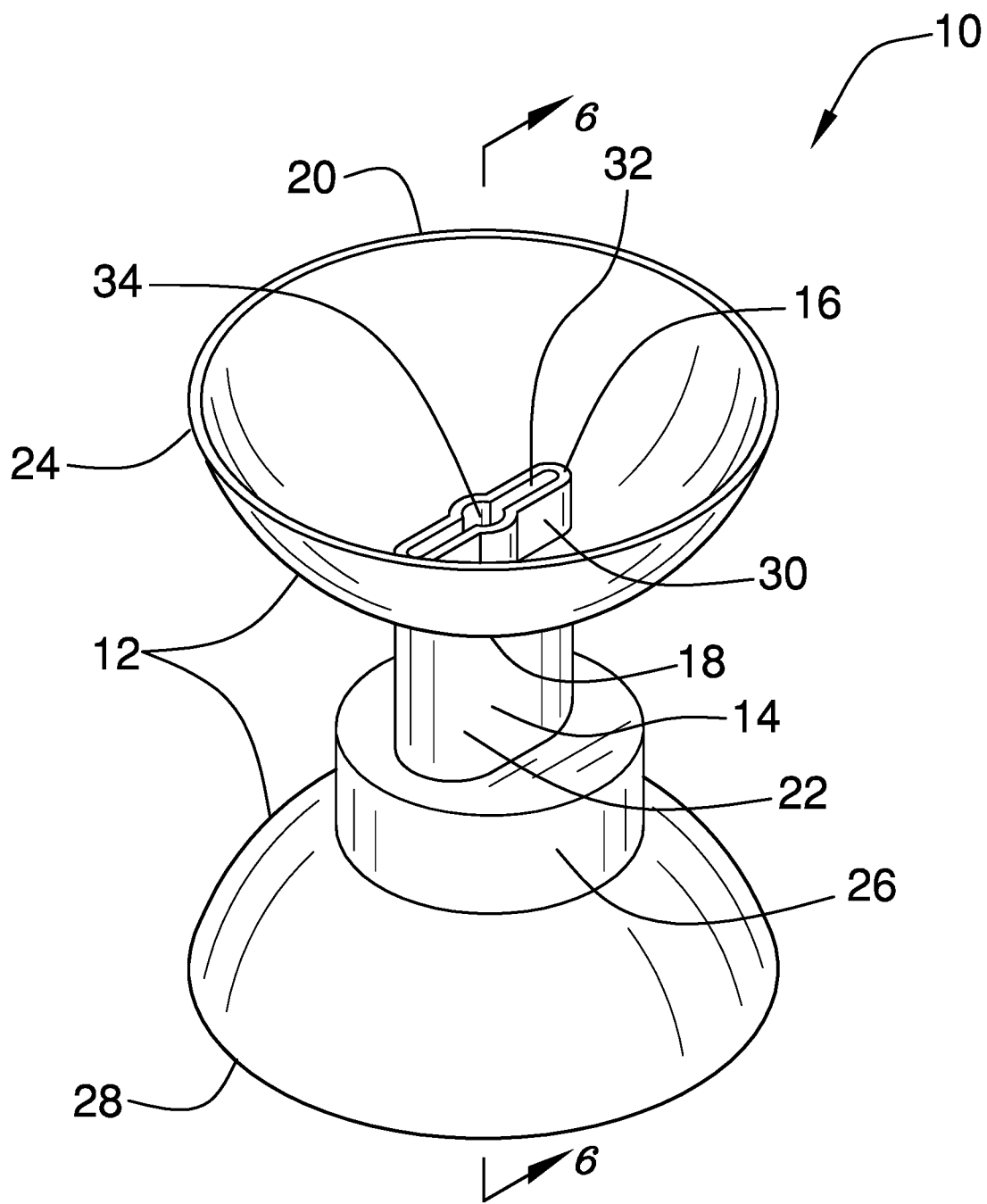
FIG. 1 is an isometric perspective view of a tableware article according to a first embodiment of the disclosure.

With reference now to the drawings, and in particular to FIGS. 1 through 15 thereof, a new tableware article embodying the principles and concepts of an embodiment of the disclosure and generally designated by the reference numeral 10 will be described.

As best illustrated in FIGS. 1 through 15, the tableware article 10 generally comprises a pair of bowls 12, a stem 14, and a bracing element 16. The bowls 12 are dome shaped. The stem 14 is coupled to and extends between bottoms 18 of the bowls 12 so that, when a top 20 of one of the pair of bowls 12 is positioned on a substantially horizontal surface, such as a table, the top 20 of the other of the pair of bowls 12 is configured to insert at least one of an item of food and a utensil. The bracing element 16 is positioned within a respective bowl 12 and is coupled to the bottom 18 of the respective bowl 12. The bracing element 16 is configured to support at least one of an associated item of food and an associated utensil.

In one embodiment, as shown in FIGS. 1, 2, 6, 9, and 10, the stem 14 comprises a first section 22 that is positioned adjacent to a first bowl 24 of the pair of bowls 12 and a second section 26 that is positioned adjacent to a second bowl 28 of the pair of bowls 12. The first section 22 is elongated ovally shaped when viewed longitudinally. The second section 26 is disc shaped.

Figure 9:
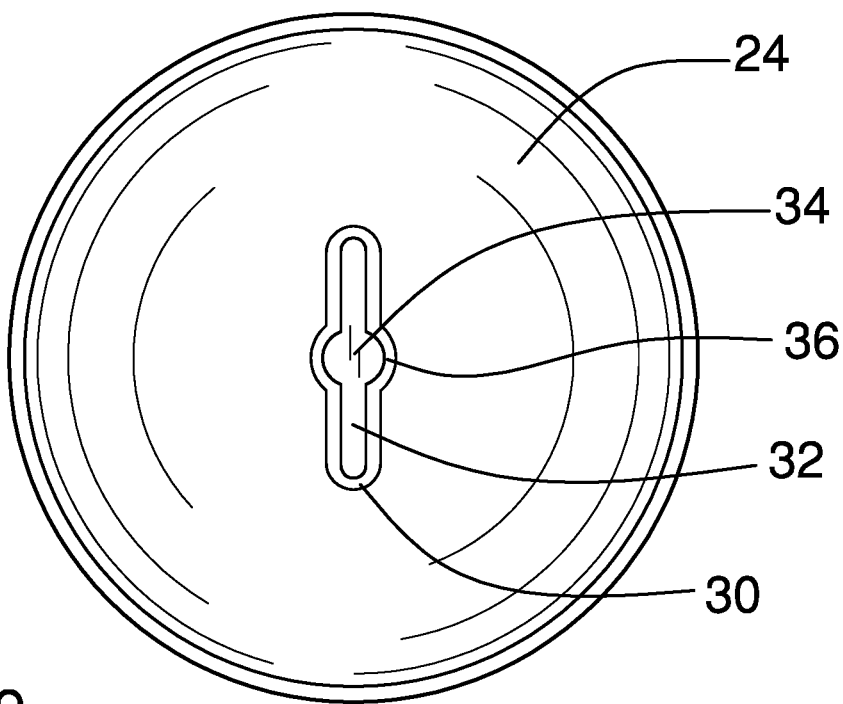
FIG. 9 is a top view of the first embodiment of the disclosure.
Figure 10:
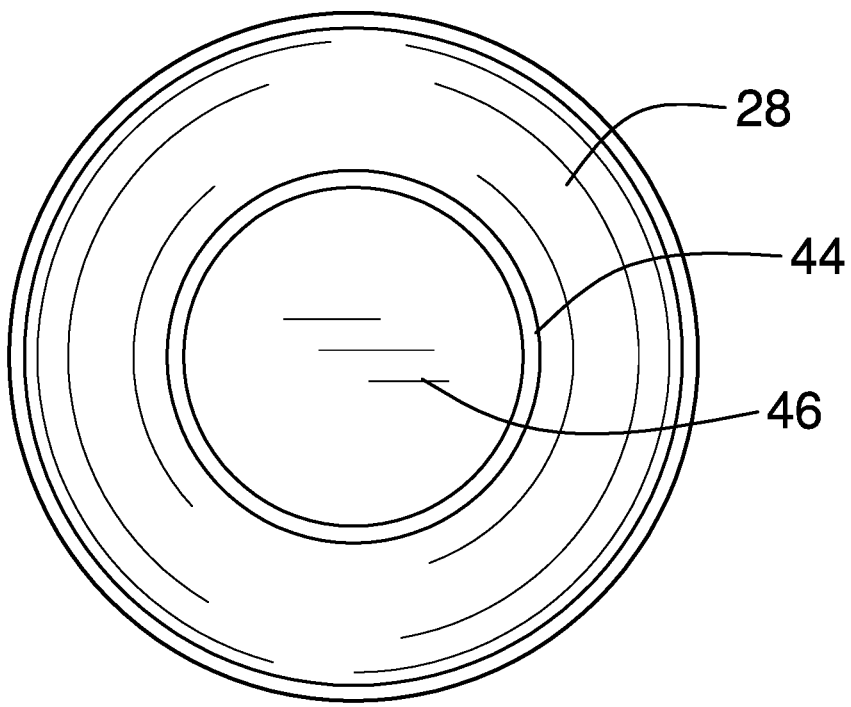
FIG. 10 is an inverted top view of the first embodiment of the disclosure.
Figure 11:
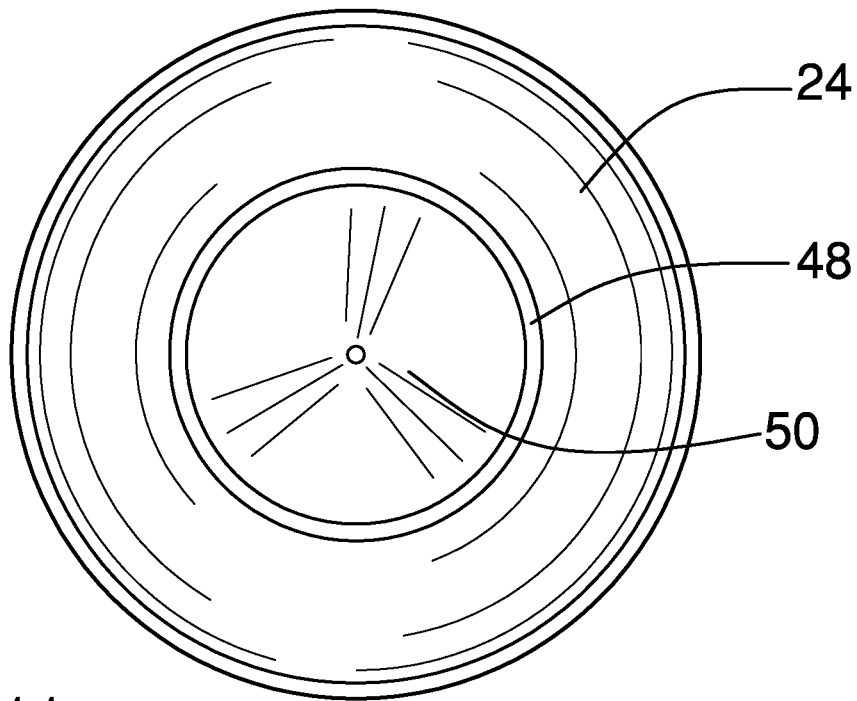
FIG. 11 is a top view of the second embodiment of the disclosure.
Figure 12:
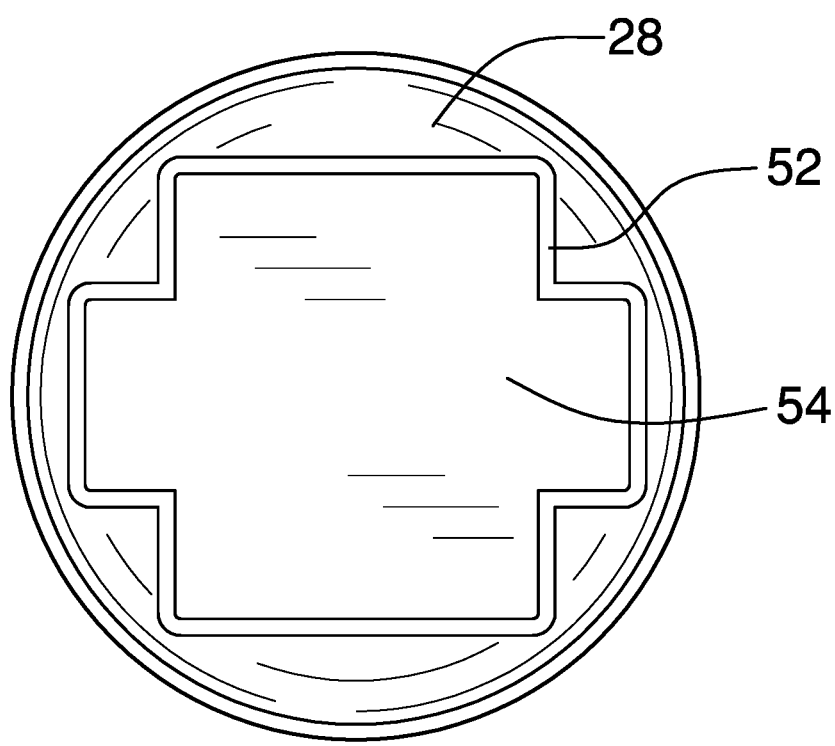
FIG. 12 is an inverted top view of the second embodiment of the disclosure.
Figure 13:
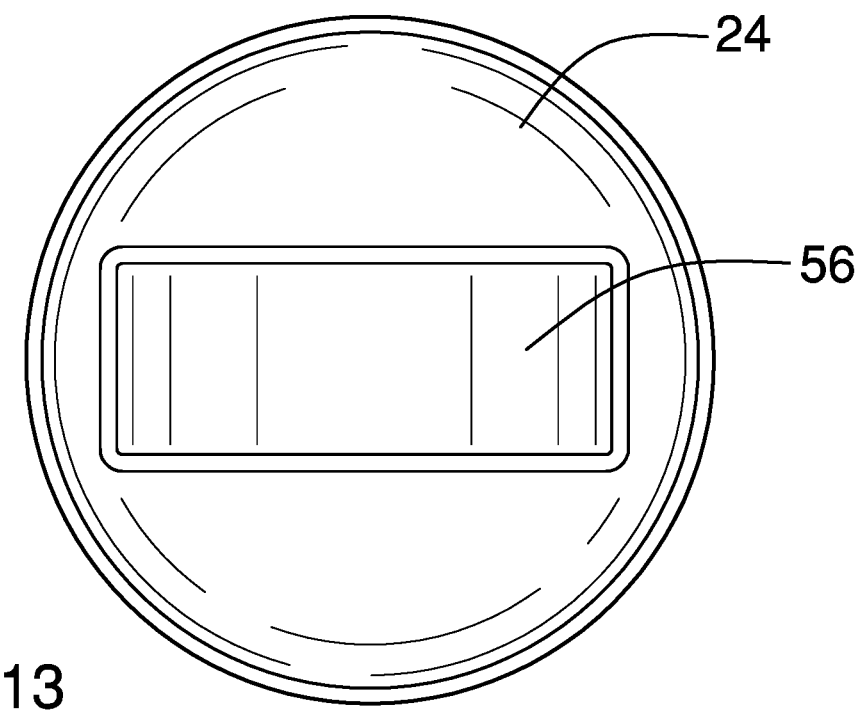
FIG. 13 is a top view of the third embodiment of the disclosure.
Figure 14:
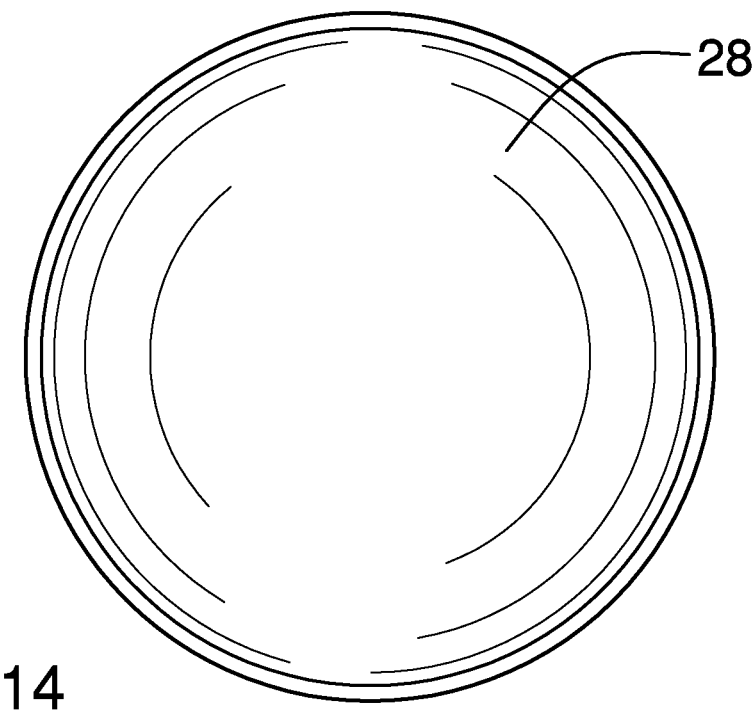
FIG. 14 is an inverted top view of the third embodiment of the disclosure.

Also, in this embodiment, the bracing element 16 comprises a pair of bracing elements 16. The pair of bracing elements 16 comprises an extension 30 of the first section 22 of the stem 14 and a first recess 32. The extension 30 protrudes into the first bowl 24, as shown in FIGS. 1 and 9.

The first recess 32 is positioned in the extension 30 and extends into the first section 22 of the stem 14. The first recess 32 is configured to insert a flat stick to removably couple the flat stick to the first bowl 24.

The first recess 32 has a centerline 34. The first recess 32 is dimensionally wider and rounded at the centerline 34 to define a bore 36. The bore 36 is configured to insert a round stick. The bore 36 has an upper section 38, a medial section 40, and a lower section 42. The upper section 38 is circumferentially larger than the medial section 40. The medial section 40 is circumferentially larger than the lower section 42. A narrow sized rounded stick is insertable through the upper section 38 and the medial section 40 into the lower section 42. A medium sized rounded stick is insertable through the upper section 38 into the medial section 40. A large sized rounded stick is insertable into the upper section 38.

Figure 2:
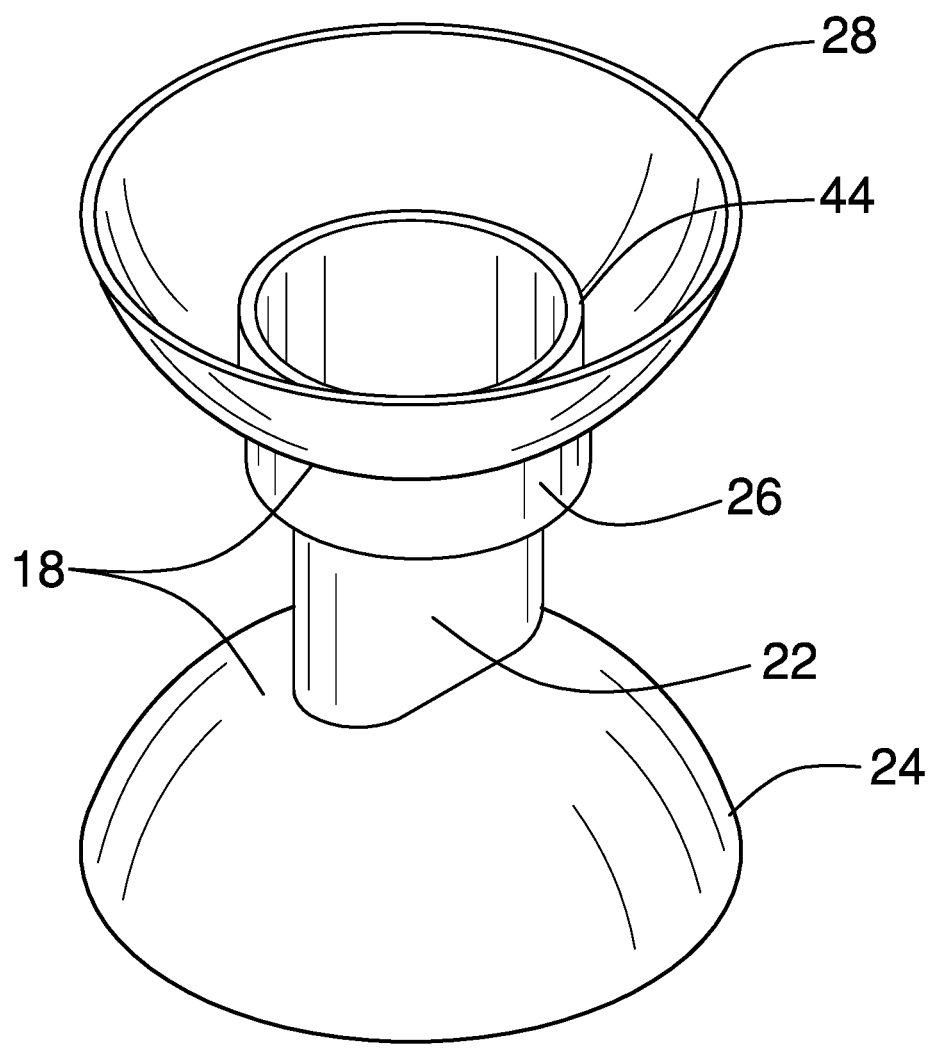
FIG. 2 is an inverted isometric perspective view of the first embodiment of the disclosure.
Figure 6:
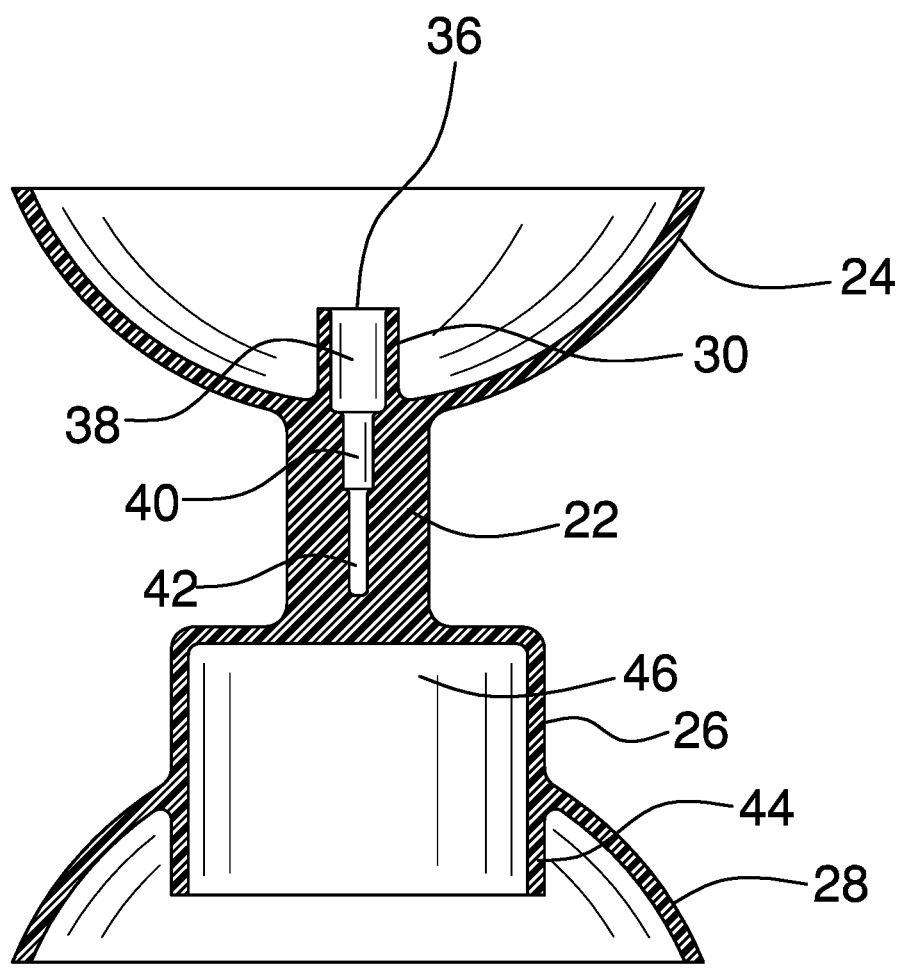
FIG. 6 is a cross-sectional view of the first embodiment of the disclosure.

Also, in this embodiment, the pair of bracing elements 16 comprises a ring 44, which is coupled to and extends from the bottom 18 of the second bowl 28 as shown in FIG. 2, and a second recess 46 that extends through the bottom 18 of the second bowl 28 into the second section 26 of the stem 14, as shown in FIG. 6. The second recess 46 is cylindrically shaped. The ring 44 is configured to selectively insert a round cone into the second recess 46 to stabilize the round cone relative to the second bowl 28.

Figure 3:
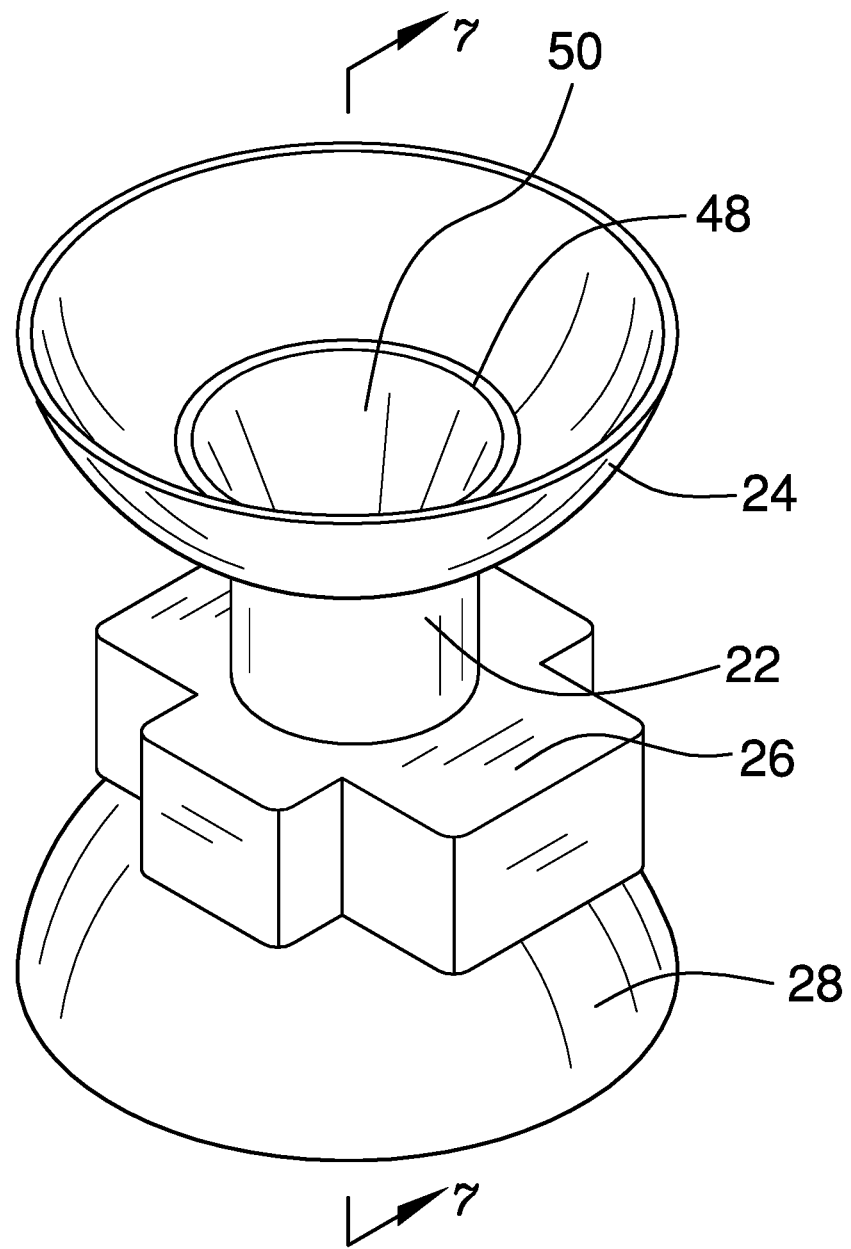
FIG. 3 is an isometric perspective view of a second embodiment of the disclosure.
Figure 7:
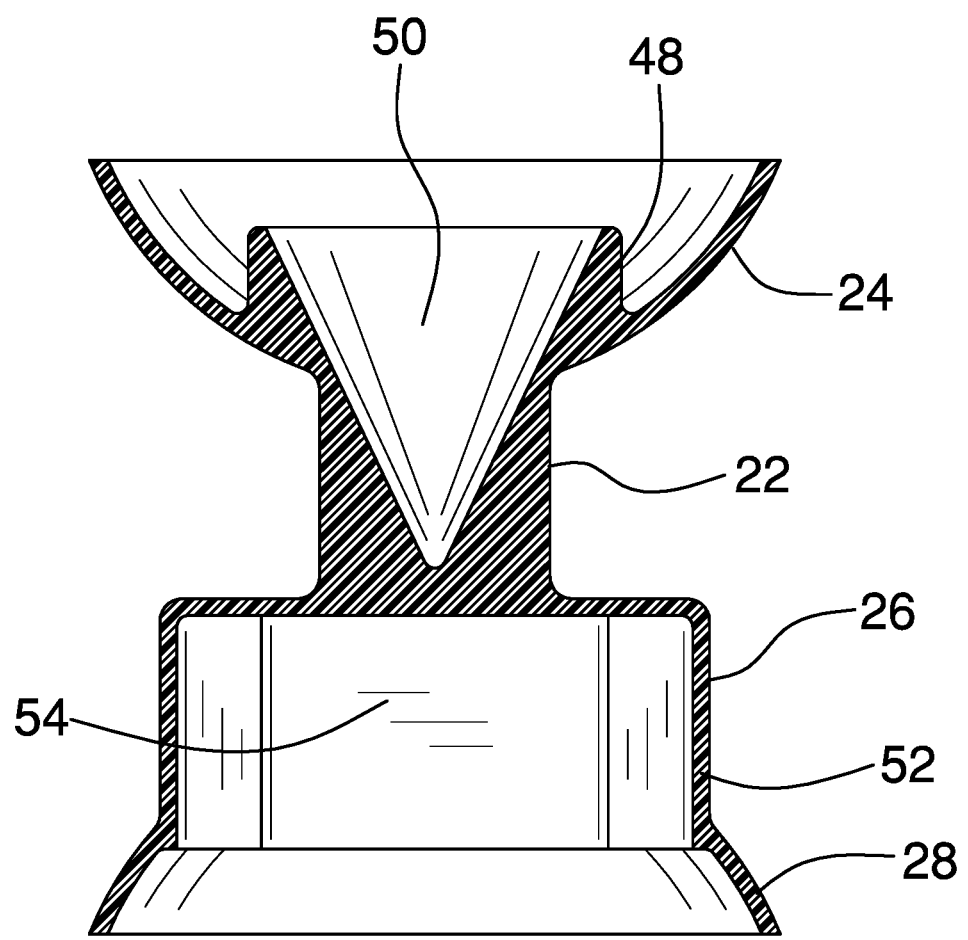
FIG. 7 is a cross-sectional view of the second embodiment of the disclosure.

In another embodiment, as shown in FIGS. 3, 4, 7, 11, and 12, the first section 22 is cylindrically shaped and the second section 26 is Greek cross shaped. In this embodiment, the bracing element 16 comprises a pair of bracing elements 16. The pair of bracing elements 16 comprises a disc 48 and a first cutout 50. The disc 48 is coupled to and extends from the bottom 18 of the first bowl 24, as shown in FIG. 3. The first cutout 50 is positioned in the disc 48 and extends into the first section 22 of the stem 14, as shown in FIG. 7. The first cutout 50 is cone shaped so that the first cutout 50 is configured to insert a conical cone to stabilize the conical cone relative to the first bowl 24.

Figure 4:
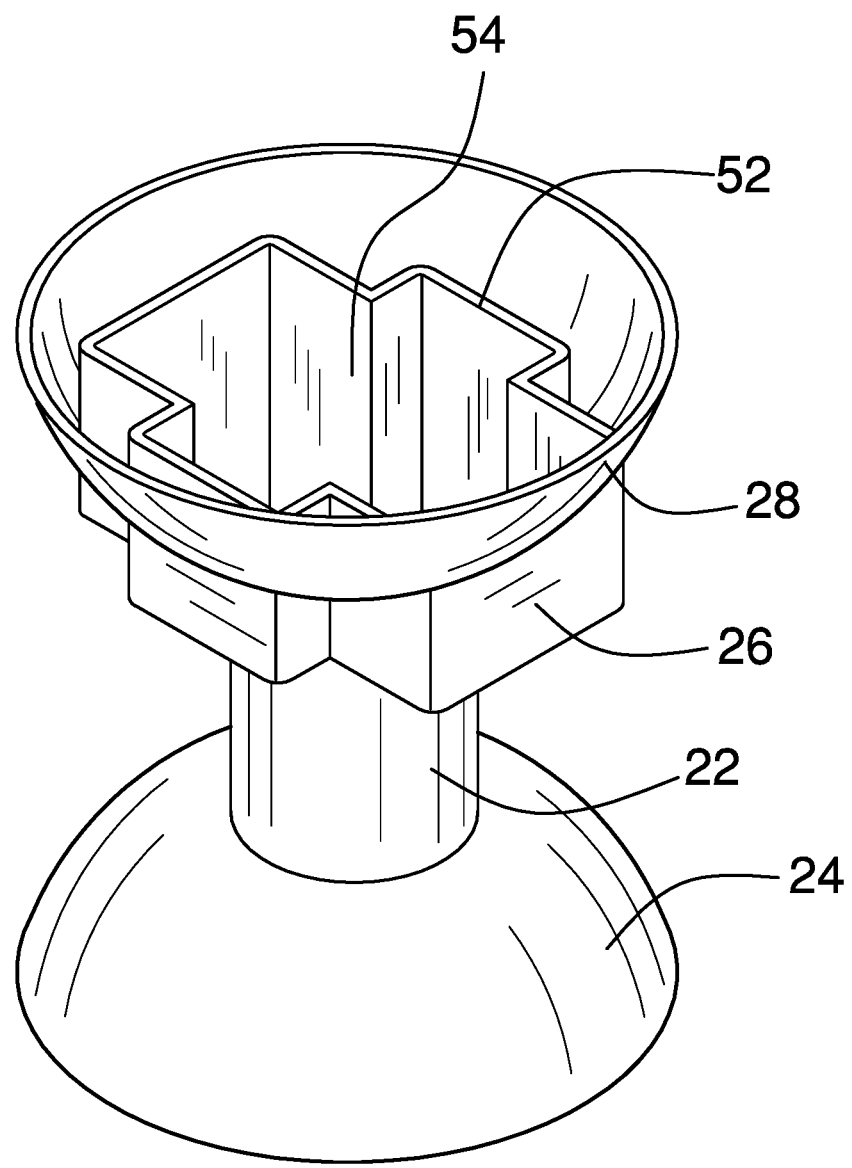
FIG. 4 is an inverted isometric perspective view of the second embodiment of the disclosure.

Also, in this embodiment, the pair of bracing elements 16 comprises a panel 52 and a second cutout 54. The panel 52, which is Greek cross shaped, is coupled to and extends from the bottom 18 of the second bowl 28, as shown in FIG. 4. The second cutout 54 extends through the bottom 18 of the bowl 12 into the second section 26 of the stem 14, as shown in FIG. 7. The panel 52 is configured to selectively insert a substantially rectangularly shaped sandwich into the second cutout 54 to stabilize the substantially rectangularly shaped sandwich relative to the second bowl 28.

Figure 5:
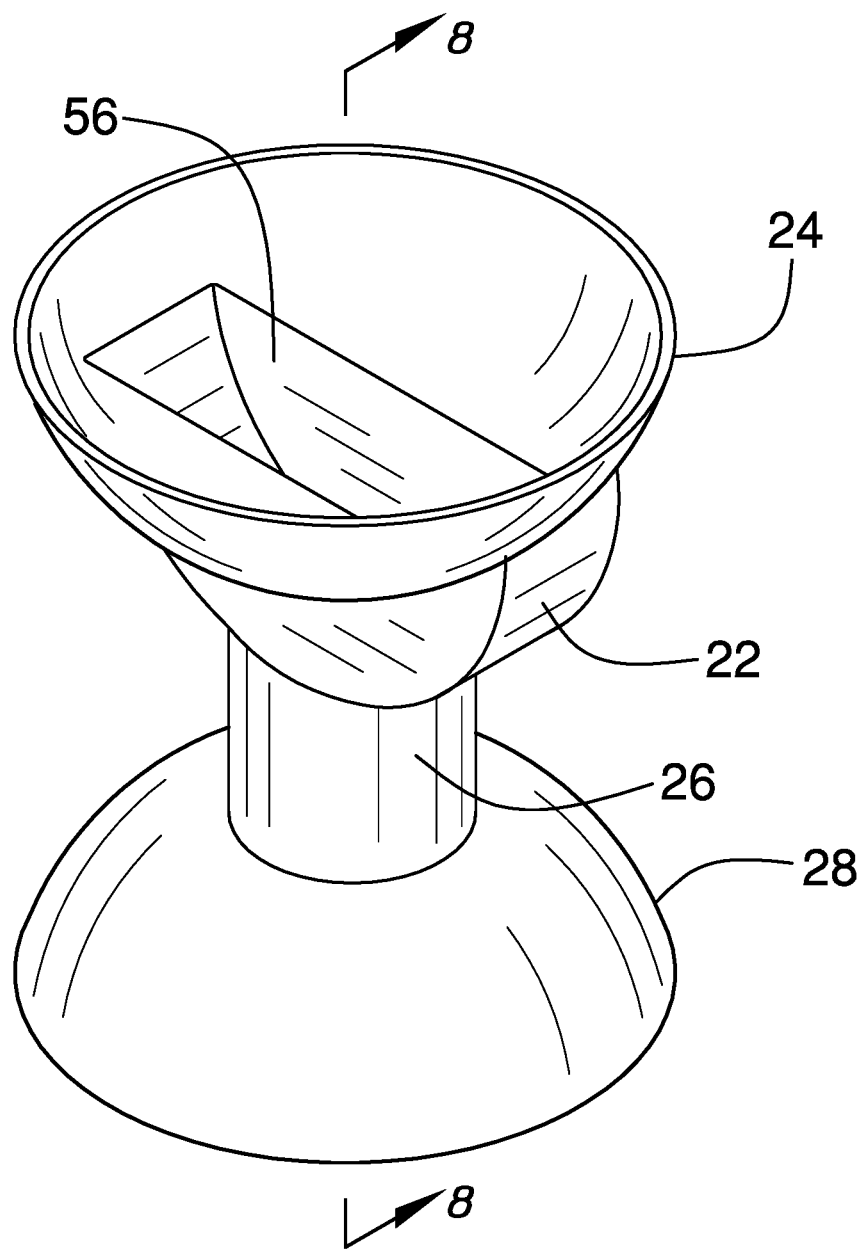
FIG. 5 is an isometric perspective view of a second embodiment of a third embodiment of the disclosure.
Figure 8:
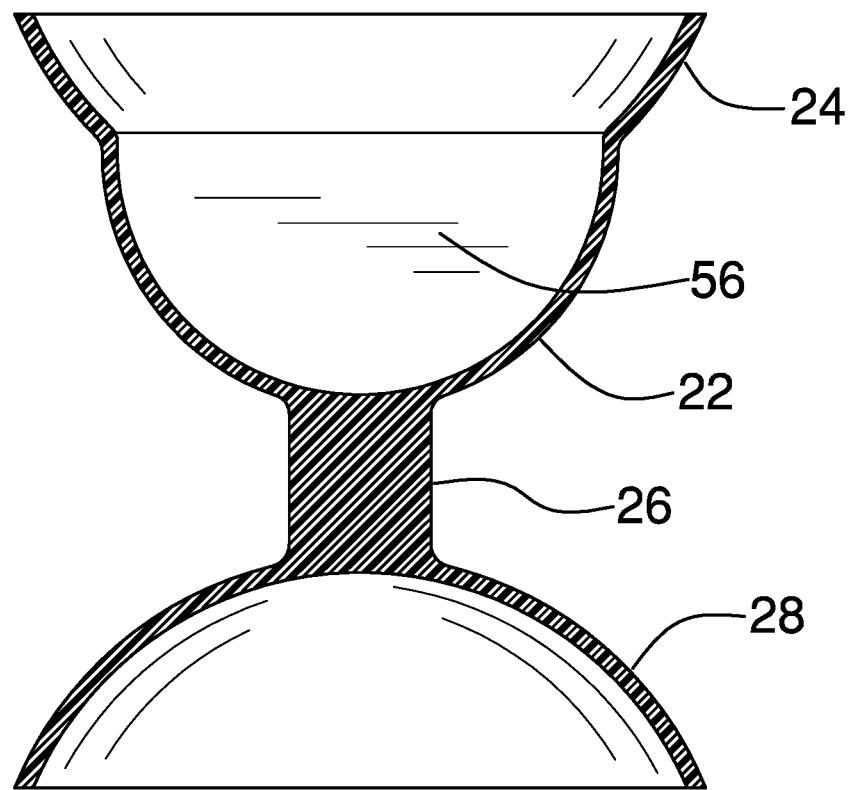
FIG. 8 is a cross-sectional view of the third embodiment of the disclosure.

In yet another embodiment, as shown in FIGS. 5, 8, 13, and 14, the first section 22 is half-disc shaped and extends into the first bowl 24, as shown in FIG. 5. The second section 26 is cylindrically shaped. The bracing element 16 comprises a void 56 that extends into the first section 22 of the stem 14 from the first bowl 24, as shown in FIG. 8. The void 56 is substantially half-disc shaped so that the void 56 is configured to insert a portion of a round sandwich to removably couple the round sandwich to the first bowl 24.

Figure 15:
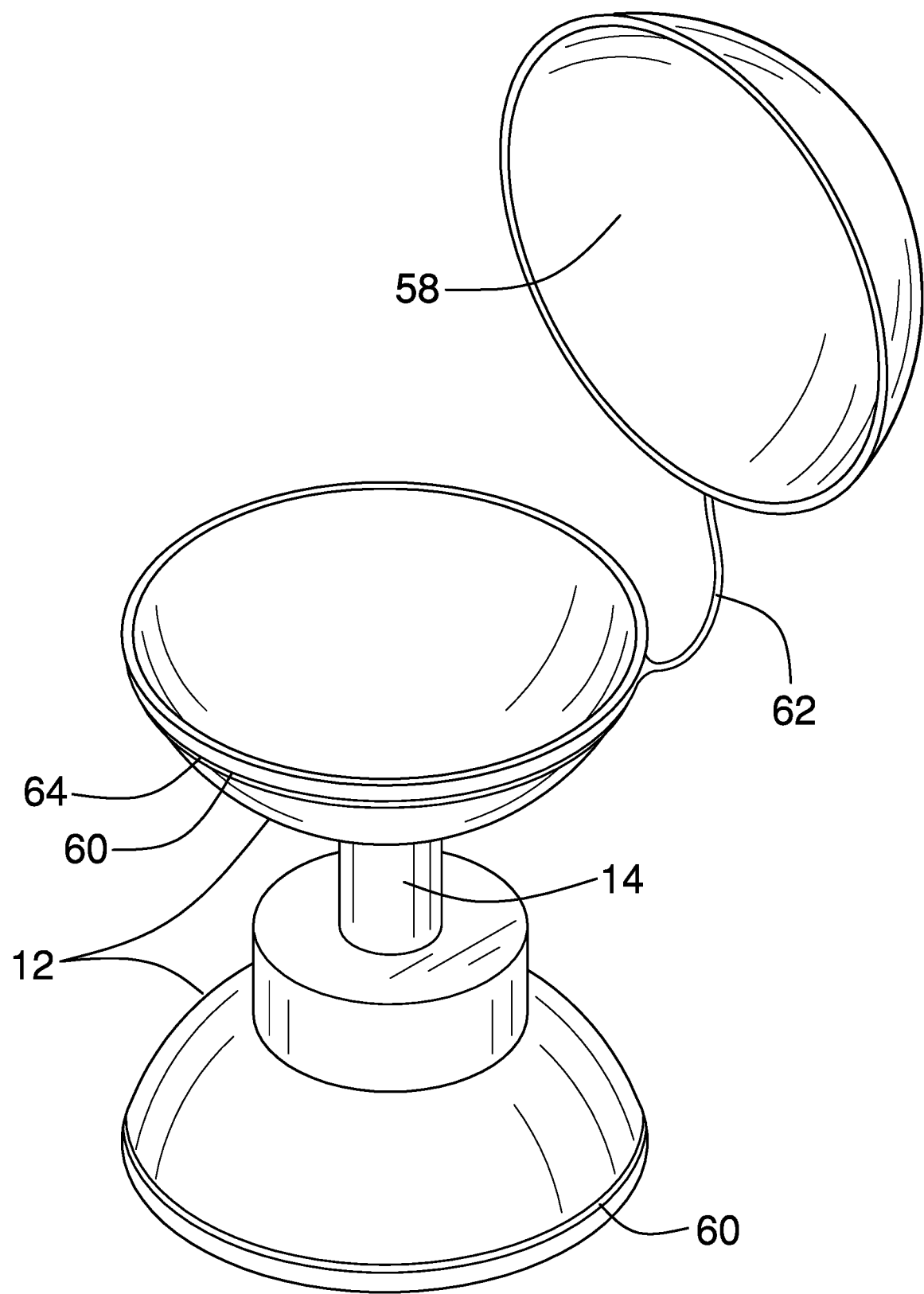
FIG. 15 is an isometric perspective view of a fourth embodiment of the disclosure.

In still yet another embodiment, as shown in FIG. 15, a lid 58 is selectably tetherable to a respective bowl 12. The lid 58, which is dome shaped, is selectively couplable to the respective bowl 12 to close the top 20.

A groove 60 is positioned in a respective bowl 12 proximate to the top 20 of the respective bowl 12. The groove 60 extends annularly around the respective bowl 12. The groove 60 comprises a pair of groves 60 that is positioned singly in the pair of bowls 12. A strap 62 is coupled to and extends from the lid 58. A band 64, which is annular, is coupled to the strap 62 distal from the lid 58. The band 64 comprises at least one of rubber, silicone, plastic, or the like, so that the band 64 is resiliently stretchable and microwavable. The band 64 is configured to be stretched to insert the top 20 of the respective bowl 12 and to rebound to insert into the groove 60 to tether the lid 58 to the respective bowl 12.

In use, a pair of bowls 12 having a respective bowl 12 that comprises a bracing element 16 suitable to the item of food or utensil that is to be positioned in the respective bowl 12 is selected and is then positioned with the top 20 of the other of the pair of bowls 12 on the substantially horizontal surface. The bracing element 16 is configured to support the item of food or the utensil.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tableware article comprising:
   a pair of bowls;
   a stem coupled to and extending between bottoms of the bowls such that, when a top of one of the pair of bowls is positioned on a substantially horizontal surface, the top of the other of the pair of bowls is configured for inserting at least one of an item of food and a utensil;
   a bracing element, the bracing element being positioned within a respective bowl and coupled to the bottom of the respective bowl, the bracing element being configured for supporting at least one of an associated item of food and an associated utensil;
   the stem comprising a first section positioned adjacent to a first bowl of the pair of bowls and a second section positioned adjacent to a second bowl of the pair of bowls, the first section being elongated ovally shaped when viewed longitudinally, the second section being disc shaped;
   the bracing element comprising a pair of bracing elements;
   the pair of bracing elements comprising an extension of the first section of the stem and a first recess, the extension protruding into the first bowl, the first recess being positioned in the extension and extending into the first section of the stem wherein the first recess is configured for inserting a flat stick for removably coupling the flat stick to the first bowl; and
   the pair of bracing elements comprising a ring coupled to and extending from the bottom of the second bowl and a second recess extending through the bottom of the second bowl into the second section of the stem, the second recess being cylindrically shaped wherein the ring is configured for selectively inserting a round cone into the second recess for stabilizing the round cone relative to the second bowl.

2. The article of claim 1, further the bowls being dome shaped.

3. The article of claim 1, further including a lid selectably tetherable to a respective bowl, the lid being selectively couplable to the respective bowl for closing the top.

4. The article of claim 3, further comprising:
a groove, the groove being positioned in a respective bowl proximate to the top of the respective bowl, the groove extending annularly around the respective bowl;
a strap coupled to and extending from the lid; and
a band coupled to the strap distal from the lid, the band being annular, the band being resiliently stretchable such that the band is configured for stretching for inserting the top of the respective bowl and for rebounding for inserting into the groove for tethering the lid to the respective bowl.

5. The article of claim 3, further including the lid being dome shaped.

6. The article of claim 4, further including the groove comprising a pair of grooves positioned singly in the pair of bowls.

7. The article of claim 4, further including the band comprising at least one of rubber, silicone, and plastic such that the band is resiliently stretchable and microwavable.

8. The article of claim 1, further including the first recess having a centerline, the first recess being dimensionally wider and rounded at the centerline defining a bore wherein the bore is configured for inserting a round stick.

9. The article of claim 8, further including the bore having an upper section, a medial section, and a lower section, the upper section being circumferentially larger than the medial section, the medial section being circumferentially larger than the lower section such that a narrow sized rounded stick is insertable through the upper section and the medial section into the lower section, a medium sized rounded stick is insertable through the upper section into the medial section, and a large sized rounded stick is insertable into the upper section.

10. A tableware article comprising:
a pair of bowls;
a stem coupled to and extending between bottoms of the bowls such that, when a top of one of the pair of bowls is positioned on a substantially horizontal surface, the top of the other of the pair of bowls is configured for inserting at least one of an item of food and a utensil;
a bracing element, the bracing element being positioned within a respective bowl and coupled to the bottom of the respective bowl, the bracing element being configured for supporting at least one of an associated item of food and an associated utensil;
the stem comprising a first section positioned adjacent to a first bowl of the pair of bowls and a second section positioned adjacent to a second bowl of the pair of bowls, the first section being cylindrically shaped, the second section being Greek cross shaped;
the bracing element comprising a pair of bracing elements;
the pair of bracing elements comprising a disc and a first cutout, the disc being coupled to and extending from the bottom of the first bowl, the first cutout being positioned in the disc and extending into the first section of the stem, the first cutout being cone shaped wherein the first cutout is configured for inserting a conical cone for stabilizing the conical cone relative to the first bowl; and
the pair of bracing elements comprising a panel and a second cutout, the panel being coupled to and extending from the bottom of the second bowl, the panel being Greek cross shaped, the second cutout extending through the bottom of the bowl into the second section of the stem wherein the panel is configured for selectively inserting a substantially rectangularly shaped sandwich into the second cutout for stabilizing the substantially rectangularly shaped sandwich relative to the second bowl.

11. A tableware article comprising:
a pair of bowls, the bowls being dome shaped;
a stem coupled to and extending between bottoms of the bowls such that, when a top of one of the pair of bowls is positioned on a substantially horizontal surface, the top of the other of the pair of bowls is configured for inserting at least one of an item of food and a utensil;
a bracing elements, the bracing element being positioned within a respective bowl and coupled to the bottom of the respective bowl, the bracing element being configured for supporting at least one of an associated item of food and an associated utensil;
a lid selectably tetherable to a respective bowl, the lid being selectively couplable to the respective bowl for closing the top, the lid being dome shaped;
a groove, the groove being positioned in a respective bowl proximate to the top of the respective bowl, the groove extending annularly around the respective bowl, the groove comprising a pair of grooves positioned singly in the pair of bowls;
a strap coupled to and extending from the lid;
a band coupled to the strap distal from the lid, the band being annular, the band being resiliently stretchable such that the band is configured for stretching for inserting the top of the respective bowl and for rebounding for inserting into the groove for tethering the lid to the respective bowl, the band comprising at least one of rubber, silicone, and plastic such that the band is resiliently stretchable and microwavable;
the stem comprising a first section positioned adjacent to a first bowl of the pair of bowls and a second section positioned adjacent to a second bowl of the pair of bowls, the first section being elongated ovally shaped when viewed longitudinally, the second section being disc shaped;
the bracing element comprising a pair of bracing elements;
the pair of bracing elements comprising an extension of the first section of the stem and a first recess, the extension protruding into the first bowl, the first recess being positioned in the extension and extending into the first section of the stem wherein the first recess is configured for inserting a flat stick for removably coupling the flat stick to the first bowl, the first recess having a centerline, the first recess being dimensionally wider and rounded at the centerline defining a bore wherein the bore is configured for inserting a round stick, the bore having an upper section, a medial section, and a lower section, the upper section being circumferentially larger than the medial section, the medial section being circumferentially larger than the lower section such that a narrow sized rounded stick is insertable through the upper section and the medial section into the lower section, a medium sized rounded stick is insertable through the upper section into the medial section, and a large sized rounded stick is insertable into the upper section; and the pair of bracing elements comprising a ring coupled to and extending from the bottom of the second bowl and a second recess extending through the bottom of the second bowl into the second section of the stem, the second recess being cylindrically shaped wherein the ring is configured for selectively inserting a round cone into the second recess for stabilizing the round cone relative to the second bowl.

12. A tableware article comprising:

a pair of bowls, the bowls being dome shaped;

a stem coupled to and extending between bottoms of the bowls such that, when a top of one of the pair of bowls is positioned on a substantially horizontal surface, the top of the other of the pair of bowls is configured for inserting at least one of an item of food and a utensil;

a bracing elements, the bracing element being positioned within a respective bowl and coupled to the bottom of the respective bowl, the bracing element being configured for supporting at least one of an associated item of food and an associated utensil;

a lid selectably tetherable to a respective bowl, the lid being selectively couplable to the respective bowl for closing the top, the lid being dome shaped;

a groove, the groove being positioned in a respective bowl proximate to the top of the respective bowl, the groove extending annularly around the respective bowl, the groove comprising a pair of grooves positioned singly in the pair of bowls;

a strap coupled to and extending from the lid;

a band coupled to the strap distal from the lid, the band being annular, the band being resiliently stretchable such that the band is configured for stretching for inserting the top of the respective bowl and for rebounding for inserting into the groove for tethering the lid to the respective bowl, the band comprising at least one of rubber, silicone, and plastic such that the band is resiliently stretchable and microwavable;

the stem comprising a first section positioned adjacent to a first bowl of the pair of bowls and a second section positioned adjacent to a second bowl of the pair of bowls, the first section being cylindrically shaped, the second section being Greek cross shaped;

the bracing element comprising a pair of bracing elements;

the pair of bracing elements comprising a disc and a first cutout, the disc being coupled to and extending from the bottom of the first bowl, the first cutout being positioned in the disc and extending into the first section of the stem, the first cutout being cone shaped wherein the first cutout is configured for inserting a conical cone for stabilizing the conical cone relative to the first bowl; and the pair of bracing elements comprising a panel and a second cutout, the panel being coupled to and extending from the bottom of the second bowl, the panel being Greek cross shaped, the second cutout extending through the bottom of the bowl into the second section of the stem wherein the panel is configured for selectively inserting a substantially rectangularly shaped sandwich into the second cutout for stabilizing the substantially rectangularly shaped sandwich relative to the second bowl.

\* \* \* \* \*